US007797399B1

(12) United States Patent
Svendsen

(10) Patent No.: US 7,797,399 B1
(45) Date of Patent: Sep. 14, 2010

(54) METHOD AND SYSTEM FOR ALLOWING DISTRIBUTED IMPORTING OF GUEST IMAGES IN A PEER-BASED PHOTOSHARING NETWORK

(75) Inventor: Hugh Svendsen, Chapel Hill, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1335 days.

(21) Appl. No.: 11/080,217

(22) Filed: Mar. 14, 2005

(51) Int. Cl.
*G06F 15/16* (2006.01)
(52) U.S. Cl. ...................................................... 709/219
(58) Field of Classification Search ................. 709/217, 709/219
See application file for complete search history.

(56) References Cited

U.S. PATENT DOCUMENTS

| | | | | |
|---|---|---|---|---|
| 5,737,601 | A * | 4/1998 | Jain et al. ................... | 707/201 |
| 5,884,325 | A * | 3/1999 | Bauer et al. ................. | 707/201 |
| 7,143,419 | B2 * | 11/2006 | Fischer et al. ............... | 719/328 |
| 7,257,639 | B1 * | 8/2007 | Li et al. ...................... | 709/232 |
| 7,392,296 | B2 * | 6/2008 | McIntyre et al. ............ | 709/219 |
| 7,460,151 | B2 * | 12/2008 | Minatogawa ............. | 348/207.1 |
| 2003/0097410 | A1 * | 5/2003 | Atkins et al. ................ | 709/206 |
| 2003/0200268 | A1 * | 10/2003 | Morris ........................ | 709/206 |
| 2005/0060316 | A1 * | 3/2005 | Kamath et al. ................ | 707/9 |
| 2005/0213147 | A1 * | 9/2005 | Minatogawa ............... | 358/1.15 |
| 2006/0095573 | A1 * | 5/2006 | Carle et al. ................. | 709/227 |

* cited by examiner

*Primary Examiner*—Benjamin R Bruckart
*Assistant Examiner*—Farhad Ali
(74) *Attorney, Agent, or Firm*—Withrow & Terranova, PLLC

(57) ABSTRACT

The present invention provides a method and system for allowing distributed importing of images in a peer-based photosharing network comprising a peer network server and a plurality of peers. Aspects of the present invention include allowing a peer owner of a destination peer to access the peer network server to set import authorization rights for the destination peer that enables the import of images from a guest. The guest may then access the peer network server from a computer that is not a peer to specify the destination peer for importing using a user ID of the peer owner, and upload one or more images to the peer network server. The peer network server then transfers the uploaded images to the destination peer from the peer network server when the destination peer becomes available on the network, thereby enabling the peer owner to import the images from the guest.

21 Claims, 5 Drawing Sheets

METHOD AND SYSTEM FOR ALLOWING DISTRIBUTED IMPORTING OF GUEST IMAGES IN A PEER-BASED PHOTOSHARING NETWORK

FIELD OF INVENTION

The present invention relates to sharing digital images over a network, and more particularly to a method and system for allowing distributed importing of guest images in a peer-based photosharing network.

BACKGROUND OF THE INVENTION

Over the past several years, photosharing has become widely accepted by photo enthusiasts. Many websites currently exist that allow users to upload digital images to the site for storage on a server and for viewing by others over the Internet. Oftentimes, images are grouped to form an album web page so that the user can invite others to view the album web page, as opposed to each individual image. Photosharing websites also allow a shopper to purchase digital images stored in the server, as well as other products based on the digital images, such as greeting cards, coffee mugs, mouse pads, and T-shirts, on which a selected image is imprinted.

Photo importing is well-known in centrally hosted photosharing architectures. Importing is accomplished through a number of means. Images may be imported to a photosharing site using e-mail, web form posting, and custom application importing through proprietary protocols. These approaches work in a centrally hosted configuration because the photosharing server is always on, and the images can be stored directly into a destination album at time of import.

This approach to photosharing, however, presents some disadvantages. In particular, users are required to upload digital images to the site, which can be time consuming, and the site requires extensive storage capacity to store the images of all the users, which can become expensive.

To address these concerns, the assignee of the present invention has developed a web-based peer-to-peer photosharing system in which all workstations and computers (peers) in the network store images locally and act as servers to other users on the network. A central site accessible by all the peers provides additional functionality, such as coordinating the peers, providing search capabilities for the peers, purchase order fulfillment, etc.

Each peer computer includes a peer application, which when executed, enables the peer computer to communicate with other peers and with a server at the central site via a network, such as the Internet. The peer application also allows the user to perform operations locally, such as browsing thumbnail images and creating greeting cards with selected images.

Conventional importing of images in P2P photosharing systems is normally accomplished only locally, i.e., there must be physical access to a computer running the peer software to import the images. Some attempts have been made to mitigate this problem however. OurPictures of Palo, Alto, Calif., for example, offers a P2P digital photo service that allows a user to choose buddies to which their images can be replicated. This means that if peer A lists Peers B & C as replication destinations, then the images specified by peer A will be transferred to peers B & C. The approach, however, lacks the ability to allow the user of peer A to import images into peer A from a remote computer. This method also does not make allowances for importing images into a peer by other registered users of the service who are not listed in the peer owner's group of buddies. This method further dictates that any user who wants to import images into peer A must be a registered user of the system and the images imported into peer A must be imported from another peer computer (e.g., Peer B or C).

Accordingly, there is need for a method and system for allowing distributed importing of guest images in a peer-based photosharing network. The method and system should allow a peer owner to remotely import images to their peer from any computer regardless of whether the computer is also a member of the peer network. The present invention addresses such a need.

BRIEF SUMMARY OF THE INVENTION

The present invention provides a method and system for allowing distributed importing of images in a peer-based photosharing network comprising a peer server and a plurality of peers. Aspects of the present invention include allowing a peer owner of a destination peer to access the peer server to set import authorization rights for the destination peer that enables the import of images from a guest. The guest may then access the peer server from a computer that is not a peer to specify the destination peer for importing using a user ID of the peer owner, and upload one or more images to the peer server. The peer server then transfers the uploaded images to the destination peer from the peer server when the destination peer becomes available on the network, thereby enabling the peer owner to import the images from the guest.

According to the method and system disclosed herein, the peer-based network provides the following advantages: 1) enables the remote importing of images into a peer by a guest even when there is no predefined relationship between the peer owner and the guest; 2) the guest may import the images even when the peer is off-line; the peer owner has ability to assign import rights on a per album basis; 3) the peer owner is informed when a guest wants to import images; 4) the peer owner may receive a message that the guest has insufficient access rights attempts to import images to the peer; 5) the ability for the peer owner to accept or deny the import; 6) the ability for the guest importer to receive a message when the remote import is completed, and a message indicating if the import was denied; and 7) the ability to import to a specific album.

DETAILED DESCRIPTION OF THE INVENTION

The present invention relates to method and system for allowing distributed importing of guest images in a peer-based photosharing network. The following description is presented to enable one of ordinary skill in the art to make and use the invention and is provided in the context of a patent application and its requirements. Various modifications to the preferred embodiments and the generic principles and features described herein will be readily apparent to those skilled in the art. For example, although the preferred embodiment is in the context of a peer-to-peer network, the same principles can be applied to a client-server environment where the guest browser communicates directly with the computer system storing the album and images. Thus, the present invention is not intended to be limited to the embodiments shown but is to be accorded the widest scope consistent with the principles and features described herein.

Figure 1:
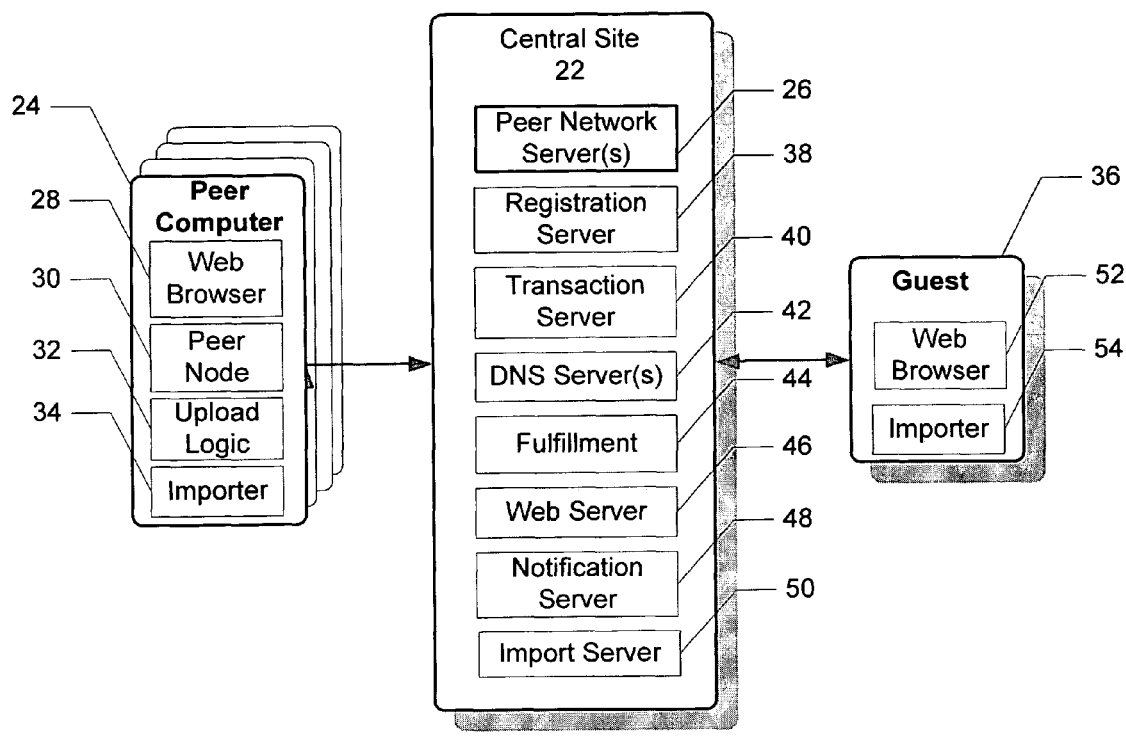
FIG. 1 is a block diagram illustrating a P2P-based photosharing network system for allowing distributed importing of images in accordance with the present invention.

FIG. 1 is a block diagram illustrating a P2P-based photosharing network system for allowing distributed importing of images in accordance with the present invention. The P2P-based photosharing network 20 includes a central photosharing web site 22 and multiple peer computers (peers) 24. The central photosharing site 22 includes one or more peer network servers (PNS) 26. Each peer computer 24 stores images of its owner (not shown) and includes a Web browser 28, peer node software 30, upload logic 32 and an importer application 34. The Web browser 28 is a standard http browser used to interact with web servers running on both the peer computers 24 and the central photosharing site 22. The peer node software 30 communicates with other peers 24 and with the PNS 26 to enable the sharing of images with other peers 24 in the network 22 through the web browser 30 as well as with a guest computer 36 that is not a peer in the peer photosharing network 20. The upload logic 32 is responsible for uploading prints and photo creations to a fulfillment server 44. The importer application 34 is responsible for importing images into the peer computer, from the peer computer 24 (e.g., by detecting newly loaded images).

According to an exemplary embodiment, the central photosharing site 22 may further include a registration server 38, a transaction server 40, a dynamic domain name server (DNS) 42, a fulfillment server 44, a web server 46, a notification server 48, and an import server 50. The registration server 38 is used to maintain a database of unique usernames for registered users of the photosharing network and associated settings. The transaction server 40 is used to conduct e-commerce activity, such as allowing peers to buy prints and photo creations. The dynamic DNS server(s) 42 maintain a dynamic list of peer names for each of the peer computers 24 and open socket connections to those peer computers 24, thereby allowing traffic routing. The proxy server 26 handles the movement of http traffic from the Internet guest 36 to the peer computers 24. The fulfillment server 44 handles the fulfillment of prints and photo gifts through an external print service (not shown). The web server 46 comprises a standard web server that serves static and dynamic pages that interact with the other components. The notification server 48 is used to save notification request, and to sends notification requests when predefined events (triggers) occur, as described further below.

The P2P-based photosharing network 20 provides a hybrid peer-to-peer architecture for general HTTP/web browser configuration in which the PNS 26 coordinates networking traffic for peers 24 behind firewalls by other peers 24 and to peers 24 by guest computers 32 not in the network 20. The PNS 26 provides supporting services to the peers 24 as well as providing a path through which the guest computer 36 accesses images from the peer computers 24 via a standard web browser 30. The guess computer 36 includes a Web browser 52, which the user uses to view content from one of the peer computers 24, and may include an importer application 54 which is responsible for importing images into the peer computer 24 through the PNS 26. The importer 54 may be implemented as a browser plug-in.

Figure 2:
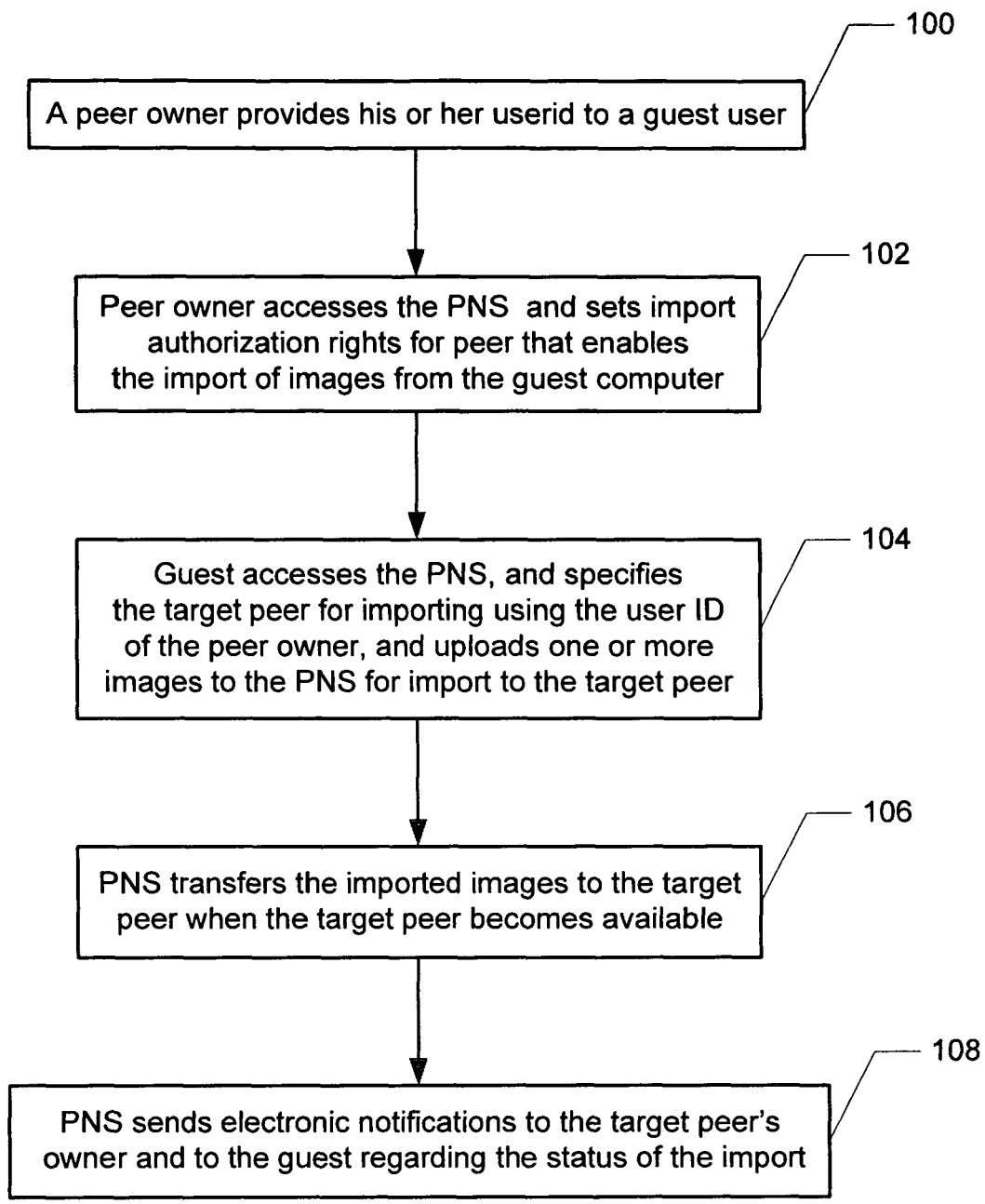
FIG. 2 is a flow diagram illustrating a process for allowing distributed importing of guest images in a peer-based photosharing network.

FIG. 2 is a flow diagram illustrating a process for allowing distributed importing of guest images in a peer-based photosharing network. The process begins in step 100 when a peer owner wants to import a third-party's images from a computer that is not a peer in the P2P network, i.e. a guest computer 36, and provides his or her user ID to a user of the guest computer 36. As referred to herein, a guest is a user who has registered with the photosharing network and receives a user ID and password, but is not running peer software on his or her computer that creates a peer computer 24 in the photosharing network 20. As used herein, the guest user and a guest computer 36 are collectively referred to as the "guest."

In step 102, the peer owner accesses the PNS 26 and sets import authorization rights for the peer 24 that enables the import of images from the guest computer 36. In step 104, the guest accesses the PNS 26, and using the user ID of the peer owner, specifies the destination peer 24 for importing, and uploads one or more images to the PNS 26 for import to the destination peer 24. The destination peer 24 may be off-line at this time. At a later time, in step 106 the PNS 26 transfers the imported images to the destination peer 24 when the destination peer 24 becomes available, assuming the guest 36 has proper import authorization rights. In an alternative embodiment, the PNS 26 may not allow the guest 36 to even upload the images to the PNS in step 104 unless the guest 36 has the proper import authorization rights. In step 108, the notification server 48 may send electronic notifications to the destination peer's owner and to the guest 36 regarding the status of the import. This function may also be performed by the PNS 26. The electronic notifications may comprise e-mail, voice-mail, and/or text messages. A notification may also be sent to the peer owner to accept or reject an attempted import by the guest 36.

In a preferred embodiment, notifications may be sent to the peer owner when a) the PNS 26 receives images for importing and the destination peer 24 is offline, b) a guest attempts to import images, but the PNS 26 determines that the guest does not have the required import rights, and c) the images have been successfully downloaded from the PNS 26 to the destination peer. In a preferred embodiment, notifications may be sent to the guest when a) images arrive at the PNS 26 and the destination peer 24 is offline, b) images arrive at the PNS 26 and the importer does not have the required import access, and c) the images have been successfully downloaded from the PNS 26 to the peer 24.

Figure 3:
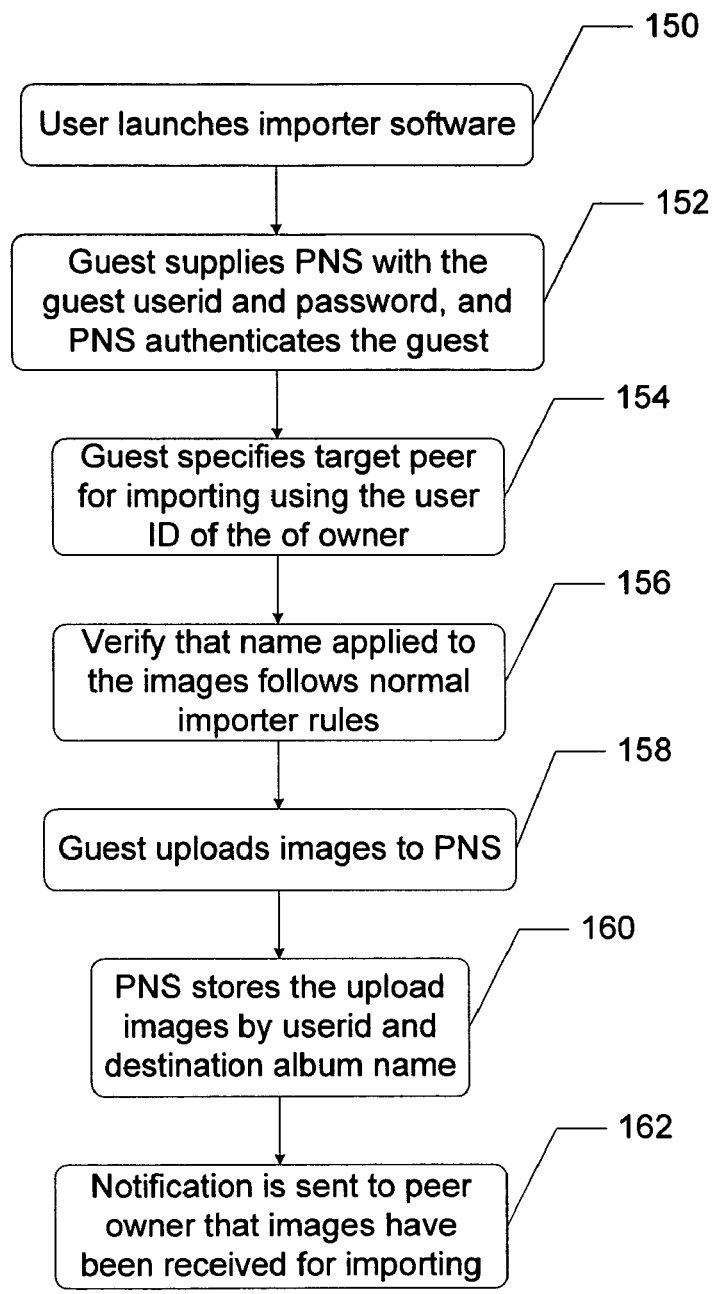
FIG. 3 is a flow diagram illustrating the process of a peer network server (PNS) importing images from the guest computer.

FIG. 3 is a flow diagram illustrating the process of the PNS 26 importing images from the guest computer 36. The process begins in step 150 in which the guest launches the importer application 54. In step 152 the guest supplies the PNS 26 with his or her user ID and password and the PNS 26 authenticates the user. In step 154 the guest specifies the destination peer for importing using the user ID of the owner. In step 156, the importer application 52 verifies that the names applied to the images to be uploaded follow importer rules. In step 158, the guest uploads the images to the PNS 26. In step 160, the PNS 26 stores the uploaded images by the guest user ID and destination album name, if any. Note here that the images are stored in storage assigned to the importer, rather than the peer 24 being imported to. In step 162, the PNS 26 sends notification to the peer owner that the images have been received for importing.

Figure 4:
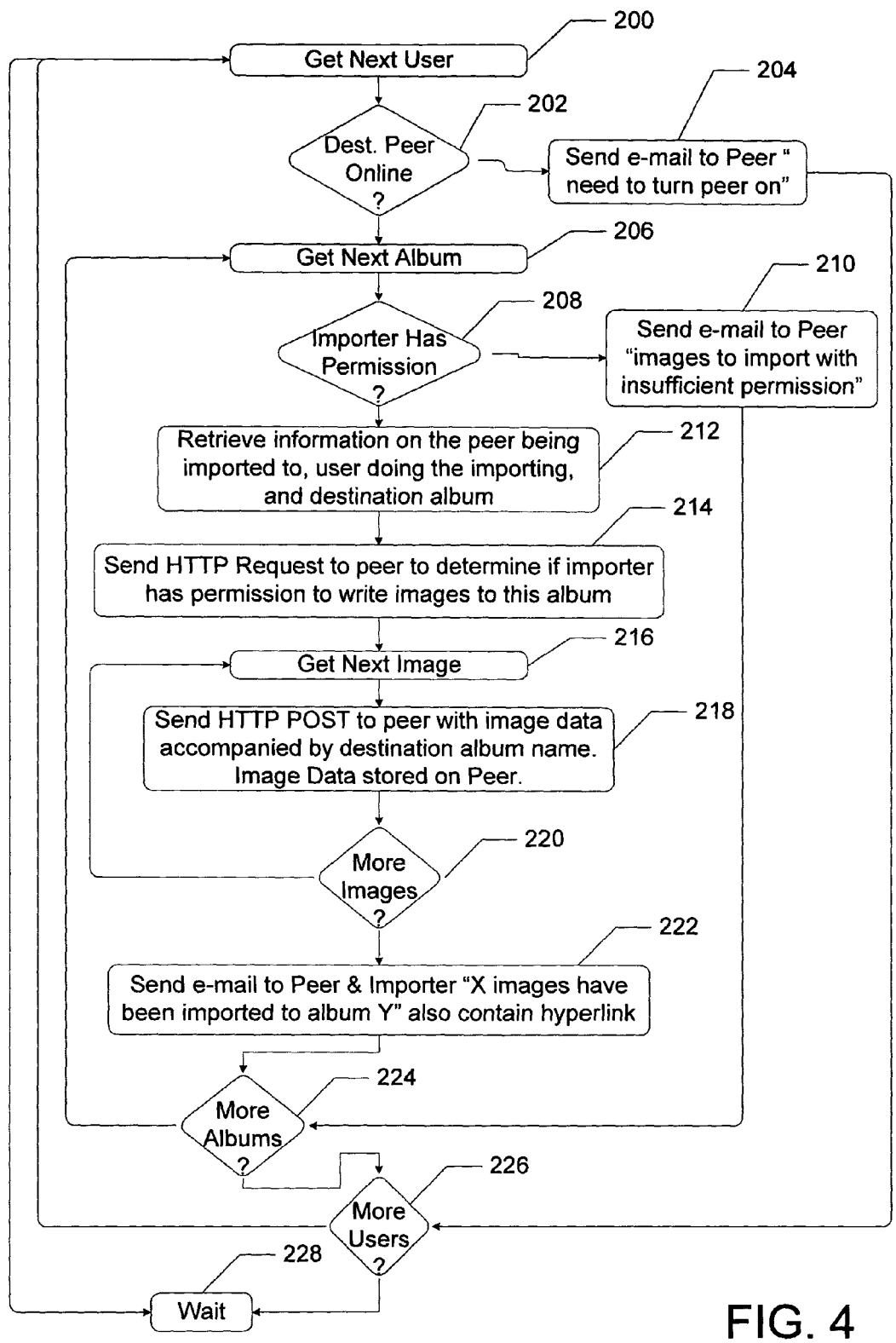
FIG. 4 is a flow diagram illustrating the process performed by the PNS after receiving imported images from the guest.

FIG. 4 is a flow diagram illustrating the process performed by the PNS 26 after receiving imported images from the guest 36. The process is preferably performed by an import thread (not shown) running within the PNS 26. The process begins in step 200 in which the download thread gets a next guest 36. In a preferred embodiment, the PNS 26 may queue the importation of images by multiple guests 36 and process them on a first-in, first-out basis.

In step 202 it is determined if the destination peer 24 is online. If the destination peer 24 is not online, then step 204 the PNS 26 sends an e-mail request to the peer owner to turn-on the peer computer 24 in order for the peer computer 24 to import the images.

If the destination peer 24 is online, then the download thread gets the next album in step 206. It is necessary to check for more than one album in case the guest 36 has uploaded multiple web albums. In step 28 is determined if the guest importer has the necessary permission to import images to the destination peer 24. If the importer does not have the authorization, then in step 210, the PNS 26 sends an e-mail to the peer owner informing the owner that a guest has attempted an unauthorized import of images.

In step 212, information is retrieved regarding the destination peer, the guest, and a destination album on the destination peer specified by the guest for importing the images to. In step 214 the PNS 26 sends an HTTP request to the destination peer to determine if the guest has permission to write images to the destination album. If the guest has permission to write images to the destination, then in step 216, the download thread gets a next imported image. In step 218, the PNS 26 sends an HTTP post to the destination peer with the image accompanied by the destination album name, resulting in the image being stored on the peer into specified album. In step 22 it is determined that if there are more imported images, and if so, the process proceeds to step 216 to get the next image.

After all the imported images have been sent to the destination peer, in step 222 the PNS 26 sends an e-mail to the peer owner and guest with a hyperlink to the album and a message indicating that X images have been imported to the album by the guest. In step 224 the download thread checks if there are more albums to process by the current guest. If there are, then the process continues to step 206 to retrieve the next album. If there are no more albums to process, then the download thread determines if there are more guest users to process in step 226. If there are more guests, and the process proceeds to step 200 to get the next guest user. If there are no more guest users to process, then the download thread waits in step 228 for the next importation.

Figure 5:
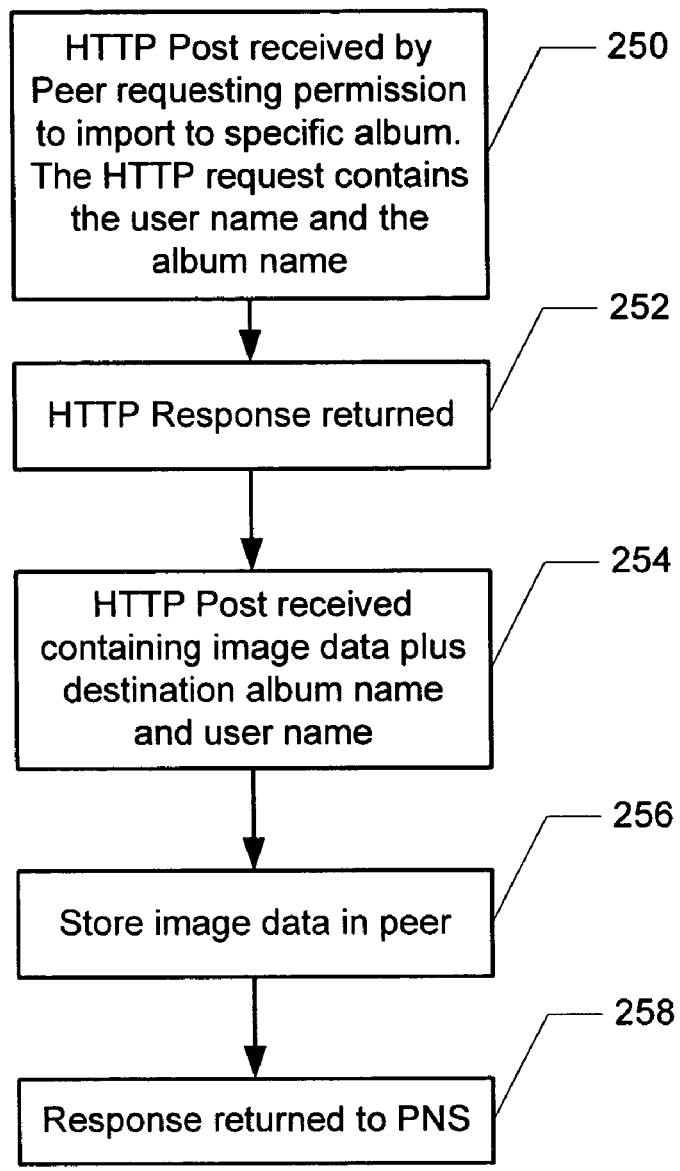
FIG. 5 is a flow diagram illustrating the process performed by the destination peer when downloading imported images from the PNS.

FIG. 5 is a flow diagram illustrating the process performed by the destination peer when the downloading imported images from the PNS 26. In the importation process that begins in step 250, the destination peer 24 receives an HTTP post request from the PNS 26 requesting permission to import a specified image to a specified album. The HTTP post may also contain the user ID of the importer if that importer is a registered user and not a guest. In step 252, the peer 24 sends an HTTP response to the PNS 26. In step 254, the peer 24 receives an HTTP post from the PNS 26 containing the image data, the destination of name, and user ID. In step 256, the image data is stored in the peer 26. And in step 258, the peer 26 returns a response to the PNS 26. Steps 250 through 258 may be repeated for each image being downloaded.

A method and system for allowing distributed importing of images in a peer-based photosharing network has been disclosed. The preferred embodiment provides the following features and advantages:

Enables remote importing of images into a peer computer by either another peer or a guest;

The ability to import images to a peer even when the peer is off-line;

The ability to assign import rights on a per album basis;

The ability for a peer owner to receive a message that a guest wants to import images to the peer even when the peer is off-line;

The ability for the peer owner to receive messages when a guest with insufficient access rights attempts to import images to the peer, and the ability for the peer owner to accept or deny the import;

The ability for the guest importer to receive a message when the remote import is completed, and a message indicating if the import was denied; and The ability to import to a specific album.

The present invention has been described in accordance with the embodiments shown, and one of ordinary skill in the art will readily recognize that there could be variations to the embodiments. Any variations would be within the spirit and scope of the present invention. Accordingly, many modifications may be made by one of ordinary skill in the art without departing from the spirit and scope of the appended claims.

What is claimed is:

1. A method for allowing distributed importing of images in a peer-based photosharing network comprising a peer network server and a plurality of peer computers, the method comprising:

allowing a peer computer owner of a destination peer computer to access the peer network server to set import authorization rights for the destination peer computer comprising a guest user identifier and a guest password that enables access to the destination peer computer via the peer network server from a guest computer, wherein the destination peer computer comprises one of a plurality of peer computers, each of the plurality of peer computers comprising peer node software adapted to provide images contained on a respective peer computer to ones of the other peer computers comprising the peer node software upon request and to communicate with the peer network server;

receiving at the peer network server from the guest computer the guest user identifier and the guest password, wherein the guest computer does not access the peer network server via the peer node software, and wherein the peer network server comprises a dynamic DNS server that maintains a dynamic list, wherein the dynamic list comprises a peer name and an open socket connection for each of the plurality of peer computers, and a fulfillment server for fulfilling a request for a print or a photo gift through a print service;

authenticating the guest computer at the peer network server based on the guest user identifier and the guest password;

allowing the guest computer to specify the destination peer computer for importing using a user ID of the peer computer owner, and to upload one or more images to the peer network server; and transferring the images uploaded by the guest computer to the destination peer computer from the peer network server when the destination peer computer becomes available on the photosharing network, without request from the destination peer computer.

2. The method of claim 1 further including: sending e-mail notifications to the peer computer owner regarding status of the import.

3. The method of claim 2 further including: sending at least one notification to the peer computer owner when any combination of the following occurs:

the peer network server receives the images for importing and the destination peer computer is offline;

the guest computer attempts to import the images, but the peer network server determines that the guest computer did not provide a valid guest user identifier or a valid guest password; and the images have been successfully downloaded from the peer network server to the destination peer computer.

4. The method of claim 3 further including: sending at least one notification to the guest computer when any combination of the following occurs:

the images arrive at the peer network server and the destination peer computer is offline;

the images arrive at the peer network server and the guest computer does not have the required import authorization rights; and the images have been successfully downloaded from the peer network server to the destination peer computer.

5. The method of claim 1 further including: allowing the guest computer to upload the images to the peer network server even if the destination peer computer is off-line.

6. The method of claim 5 further including: transferring the uploaded images from the peer network server to the destination peer computer only if the guest computer has proper import authorization rights.

7. The method of claim 5 further including: allowing the guest computer to upload images to the peer network server only if the guest computer provides proper import authorization rights.

8. The method of claim 1 further including: queuing by the peer network server the images uploaded from multiple guest computers and processing the imported images of each of the multiple guest computers on a first-in, first-out basis.

9. The method of claim 8 wherein transferring the uploaded images from the peer network server to the destination peer computer further includes:

retrieving information regarding the destination peer computer, the guest computer, and a destination album on the destination peer computer specified by the guest computer for importing the images to;

sending a respective HTTP post to the destination peer computer for each of the uploaded images accompanied by the destination album name, resulting in the image being stored on the destination peer computer into a specified album; and after all the imported images have been sent to the destination peer computer, sending an e-mail to the peer computer owner and the guest computer with a hyperlink to the album and a message indicating that the images have been imported to the album by the guest computer.

10. The method of claim 1 wherein transferring the uploaded images from the peer network server to the destination peer computer further includes:

receiving by the destination peer computer an HTTP post request from the peer network server requesting permission to import a specified image to a specified album;

sending an HTTP response from the destination peer computer to the peer network server;

receiving by the destination peer computer an HTTP post from the peer network server containing the image and a name of the specified album;

storing the image and returning a response to the peer network server; and repeating the above steps for each image being downloaded from the peer network server to the destination peer computer.

11. A peer-based photosharing network, comprising:

a plurality of peers, each peer including a web browser and peer node software for providing images contained on each respective peer to ones of the other peers comprising peer node software in the photosharing network and to communicate with at least one peer network server;

a dynamic DNS server that maintains a dynamic list, wherein the dynamic list comprises a peer name and an open socket connection for each of the plurality of peers;

a fulfillment server for fulfilling a request for a print or a photo gift through a print service:

at least one guest, the guest comprising a registered user of the photosharing network and a guest computer that is not a peer in the photosharing network, wherein the guest has images to be imported to a destination peer; and a photosharing site on the photosharing network including the at least one peer network server, the at least one peer network server including functions for:

allowing a peer owner of the destination peer to access the peer network server to set import authorization rights for the destination peer comprising a guest user identifier and a guest password that that enables access to the destination peer via the peer network server from the guest computer;

receiving at the peer network server from the guest computer the guest user identifier and the guest password, wherein the guest computer does not access the peer network server via the peer node software;

authenticating the guest computer at the peer network server based on the guest user identifier and the guest password;

allowing the guest to specify the destination peer for importing using a user ID of the peer owner, and to upload one or more images to the peer network server; and transferring the images uploaded by the guest to the destination peer from the peer network server when the destination peer becomes available on the photosharing network, without request from the destination peer computer.

12. The peer-based photosharing network of claim 11 wherein the photosharing site further comprises:

a registration server used to maintain a database of unique usernames for registered users of the photosharing network and associated settings;

a transaction server that conducts e-commerce activity;

a proxy server for handling HTTP traffic from the guest to the peers;

a web server for serving static and dynamic web pages; and a notification server that processes notification requests when predefined events occur.

13. The peer-based photosharing network of claim 12 wherein the notification server sends e-mail notifications to the peer owner and to the guest regarding status of the import.

14. The peer-based photosharing network of claim 13 wherein the notification server sends at least one notification to the peer owner when any combination of the following occurs:

the peer network server receives the images for importing and the destination peer is offline;

the guest attempts to import the images, but the peer network server determines that the guest does not have the required import authorization rights; and the images have been successfully downloaded from the peer network server to the destination peer.

15. The peer-based photosharing network of claim 13 wherein the notification server sends at least one notification to the guest when any combination of the following occurs:
- the images arrive at the peer network server and the destination peer is offline;
- the images arrive at the peer network server and the guest does not have the required import authorization rights; and
- the images have been successfully downloaded from the peer network server to the destination peer.

16. A non-transitory medium containing program instructions for allowing distributed importing of images in a peer-based photosharing network comprising a peer network server and a plurality of peer computers, the program instructions for:
- allowing a peer owner of a destination peer computer to access the peer network server to set import authorization rights for the destination peer computer comprising a guest user identifier and a guest password that enables access to the destination peer computer via the peer network server from a guest computer, wherein the destination peer computer comprises one of a plurality of peer computers, each of the plurality of peer computers comprising peer node software adapted to provide images contained on a respective peer computer to ones of the other peer computers comprising the peer node software upon request and to communicate with the peer network server;
- receiving at the peer network server from the guest computer the guest user identifier and the guest password, wherein the guest computer does not access the peer network server via the peer node software, and wherein the peer network server comprises a dynamic DNS server that maintains a dynamic list, wherein the dynamic list comprises a peer name and an open socket connection for each of the plurality of peer computers, and a fulfillment server for fulfilling a request for a print or a photo gift through a print service;
- authenticating the guest computer at the peer network server based on the guest user identifier and the guest password;
- allowing the guest computer to specify the destination peer computer for importing using a user ID of the peer owner, and to upload one or more images to the peer network server; and
- transferring the images uploaded by the guest computer to the destination peer computer from the peer network server when the destination peer computer becomes available on the photosharing network, without request from the destination peer computer.

17. A system for allowing distributed importing of images in a peer-based photosharing network comprising a peer network server and a plurality of peer computers, the system comprising:
- means for allowing a peer owner of a destination peer computer to access the peer network server to set import authorization rights for the destination peer computer comprising a guest user identifier and a guest password that enables access to the destination peer computer via the peer network server from a guest computer, wherein the destination peer computer comprises one of a plurality of peer computers, each of the plurality of peer computers comprising peer node software adapted to provide images contained on a respective peer computer to ones of the other peer computers comprising the peer node software upon request and to communicate with the peer network server;
- means for receiving at the peer network server from the guest computer the guest user identifier and guest password, wherein the guest computer does not access the peer network server via the peer node software, and wherein the peer network server comprises a dynamic DNS server that maintains a dynamic list, wherein the dynamic list comprises a peer name and an open socket connection for each of the plurality of peer computers, and a fulfillment server for fulfilling a request for a print or a photo gift through a print service;
- means for authenticating the guest computer at the peer network server based on the guest user identifier and the guest password;
- means for allowing the guest computer to specify the destination peer computer for importing using a user ID of the peer owner, and to upload one or more images to the peer network server; and
- means for transferring the images uploaded by the guest computer to the destination peer computer from the peer network server when the destination peer computer becomes available on the network, without request from the destination peer computer.

18. A method performed on a peer network server for importing images to a peer computer in a peer-based photosharing network from a guest computer comprising:
- receiving, by the peer network server, from a first peer computer of a plurality of peer computers, wherein each of the plurality of peer computers comprises a peer node software module adapted to provide images contained on a respective peer computer to ones of the other peer computers comprising the peer node software module upon request and to communicate with the peer network server, import authorization rights comprising a guest user identifier and a guest password authorizing the guest computer to import images onto the peer network server that are destined for the first peer computer;
- receiving, by the peer network server, from the guest computer the guest user identifier and the guest password, wherein the guest computer does not access the peer network server via the peer node software module, and wherein the peer network server comprises a dynamic DNS server that maintains a dynamic list, wherein the dynamic list comprises a peer name and an open socket connection for each of the plurality of peer computers, and a fulfillment server for fulfilling a request for a print or a photo gift through a print service;
- authenticating the guest computer at the peer network server based on the guest user identifier and the guest password;
- receiving, by the peer network server, from the guest computer an identifier identifying the first peer computer;
- receiving, by the peer network server, one or more images from the guest computer destined for the first peer computer;
- determining, by the peer network server, that the first peer computer is available for image transfer; and
- transferring, by the peer network server, the one or more images to the first peer computer without request from the first peer computer.

19. The method of claim 18 further comprising receiving authentication information from the guest computer authenticating the guest computer to the peer network server.

20. The method of claim 18 further comprising sending, by the guest computer, the one or more images destined for the first peer computer via a web browser executing on the guest computer.

21. A peer network server for importing images to a peer computer in a peer-based photosharing network from a guest computer comprising:

a network interface adapted to communicate with a network; and a controller coupled to the network interface and adapted to:

receive from a first peer computer of a plurality of peer computers, wherein each of the plurality of peer computers comprises a peer node software module adapted to provide images contained on a respective peer computer to ones of the other peer computers comprising the peer node software module upon request and to communicate with the peer network server, import authorization rights comprising a guest user identifier and a guest password authorizing the guest computer to import images onto the peer network server that are destined for the first peer computer;

receive from the guest computer the guest user identifier and the guest password, wherein the guest computer does not access the peer network server via the peer node software module, and wherein the peer network server comprises a dynamic DNS server that maintains a dynamic list, wherein the dynamic list comprises a peer name and an open socket connection for each of the plurality of peer computers, and a fulfillment server for fulfilling a request for a print or a photo gift through a print service;

authenticate the guest computer based on the guest user identifier and the guest password;

receive from the guest computer an identifier identifying the first peer computer;

receive one or more images from the guest computer destined for the first peer computer;

determine that the first peer computer is available for image transfer; and transfer the one or more images to the first peer computer without request from the first peer computer.

\* \* \* \* \*